(12) United States Patent
Kapeliouchko et al.

(10) Patent No.: US 6,262,209 B1
(45) Date of Patent: Jul. 17, 2001

(54) PROCESS FOR PREPARING MODIFIED PTFE

(75) Inventors: Valery Kapeliouchko, Alessandria; Enrico Marchese, Quarto Inferiore, both of (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/235,407

(22) Filed: Jan. 22, 1999

(30) Foreign Application Priority Data

Jan. 22, 1998 (IT) ................................. MI98A0101

(51) Int. Cl.[7] .................................................. C08F 214/26
(52) U.S. Cl. .......................... 526/247; 526/229; 526/250; 526/253; 526/254
(58) Field of Search .................................... 526/247, 250, 526/253, 254, 229

(56) References Cited

U.S. PATENT DOCUMENTS

| | | |
|---|---|---|
| 3,655,611 | 4/1972 | Mueller et al. . |
| 3,855,191 | 12/1974 | Doughty, Jr. et al. . |
| 4,864,006 | * 9/1989 | Giannetti ............................ 526/209 |
| 5,576,402 | 11/1996 | Felix et al. . |
| 6,013,712 | * 1/2000 | Chittofrati ........................... 524/366 |

FOREIGN PATENT DOCUMENTS

| | | |
|---|---|---|
| 0 041 687 | 12/1981 | (EP) . |
| 1111343 | 6/1984 | (EP) . |
| 0 359 147 | 3/1990 | (EP) . |
| 0 583 481 | 2/1994 | (EP) . |
| 649 863 A1 | 4/1995 | (EP) . |

OTHER PUBLICATIONS

The Moleculare Structure of Perfluorocarbon Polymers. Infrared Studies on Polytetrafluoroethylene[1]; R. E. Moynihan; Journal of American Chem. Soc.; vol. 81; Mar. 5, 1959; pp. 1045–1050.

* cited by examiner

*Primary Examiner*—Fred Zitomer
(74) *Attorney, Agent, or Firm*—Arent Fox Kintner Plotkin & Kahn PLLC

(57) ABSTRACT

Method for preparing modified PTFE by suspension, wherein as comonomers perfluoroalkylvinylethers in which the alkyl has from 1 to 5 carbon atoms, and/or a perfluorodioxole are used, characterized by the following conditions:

a part of the comonomer, from 15 to 90% by weight of the total amount is to be fed at the beginning of the reaction; the remaining part of the comonomer is to be distributed during the reaction so as to obtain a constant speed of the comonomer incorporation in the polymer chain;

a perfluorinated surfactant and a buffering salt are used;

a persulphate with a reducing agent is used as initiator in such a ratio as to generate a part of the radicals from the redox reaction and another one from the persulphate thermal decomposition;

one operates with a polymerization pressure from 15 to 30 bar.

10 Claims, No Drawings

PROCESS FOR PREPARING MODIFIED PTFE

The present invention relates to a process for producing polytetrafluoroethylene (PTFE) modified by a suspension process which allows to obtain a product with improved application characteristichs and with high productivity.

It is known that the modified PTFE is a polymer based on tetrafluoroethylene (TFE) containing small amounts of comonomers, which, as well as the PTFE homopolymer, cannot be transformed as thermoprocessable.

The PTFE is produced with a polymerization process in which only a small amount or no amount of surfactant is used and a strong stirring is applied so as to obtain precipitated polymer flocks. This process is called polymerization in suspension.

Another TFE polymerization process is also known: the polymerization in dispersion. In this process a sufficiently high amount of surfactant is used so as to be able to stabilize the PTFE colloidal particles and a mild stirring is applied so as to avoid the polymer coagulation (precipitation). Successively the latex obtained from this process can be coagulated and a PTFE powder can be obtained. This kind of powder is called "fine powder".

The two polymerization processes give two completely different products:
the suspension product can be molded or extruded by RAM extrusion; on the contrary the fine powder of the dispersion process can be transformed by paste extrusion;
viceversa the suspension powder cannot be transformed by paste extrusion; the "fine powder" cannot be transformed by molding or RAM extrusion.

It is also known that by modifying the suspension PTFE with small amounts of perfluorinated comonomers, in particular with perfluoroalkylvinylethers or perfluoro-dioxoles, an increase of the amorphous part in the sintered polymer is obtained which allows to obtain very good tensile characteristics in the polymer with a lower molecular weight in comparison with the PTFE homopolymer. This allows to obtain a product having improved dielectric and optical properties. It is also noticed an improvement of the seal propoerties, a decrease of the permeability to gases and of the creep of the modified PTFE in comparison with the homopolymer.

One of the main applications of the suspension modified PTFE powder is the production of the skived tape. Besides the above characteristics, the tape homogeneity characteristics are very important: pollutions, transparence variations, colours. In particular, the dishomogeneity of the skived tape of the suspension modified PTFE can appear under the form of transparent halos or opaque marbleizations.

It is known that because of the lower reactivity of the fluorinated comonomers compared with that of the TFE and because of the chain transfer reactions due both directly to the comonomers and to the impurities present in the same, the polymerization reactions of the suspension modified PTFE have a meaningfully lower productivity with respect to the suspension PTFE. This fact is the main reason of the cost difference between the modified PTFE and the suspension homopolymer, since the difference due to the cost of the comonomer is rather slight, due to the small amounts used.

In U.S. Pat. No. 3,855,193 it is described a process for producing the suspension modified PTFE, by using as comonomer a perfluoroalkylvinylether, preferably perfluoropropyl vinylether (PPVE), in amounts from 0.03 to 0.16% by weight, and by using from 3 to 200 ppm of fluorinated surfactant together with a buffering salt. The product is characterized by an amorphous material content lower than 8%, it has a good resistance to creep, a low surface roughness and an improved thermal stability in comparison with the product, modified with hexafluoropropene, described in U.S. Pat. No. 3,655,611. However by operating according to the examples described in the U.S. Pat. No. 3,855,191, polymers giving skived tapes having a low homogeneity degree and not high tensile characteristics, are obtained (see the comparative examples of the present invention).

In EP 649,863 a method to obtain the suspension modified PTFE by with very good tensile and dielectric characteristics is described, by using as initiators the permanganate salts with oxalates, which establish a combined redox/thermal system and carrying out the process at low tempratures. However the use of permanganate makes it possible the formation of the manganese oxide which with difficulty can be removed from the polymer, or makes it necessary to carry out the polymerization in a strongly acid ambient which gives rise to problems connected to the autoclave corrosion and to the polymer pollution from the corros ion products. moreover in this patent low reaction temperatures (lower than 60° C.) and low polymerization pressures from 5 to 15 bar are suggested. These two choices, since the PPVE reactivity strongly decreases with the decrease of the polymerization temperatures, lead to low polymerization yields which, indeed, are in the range of 90–130 g/(l·hr).

Moreover in EP 649,863 it is stated that the use of a fluorinated surfactant in the process described therein leads to the presence of agglomerates. These are undesired since they bring dishomogeneity of the product according to what described in the patent.

In U.S. Pat. No. 5,576,402 a process for producing the suspension modified PTFE is described, by using as initiators persulphates and polymerizing without introducing in the polymerization medium ammonium ions which give rise to coloured pollutions in the final product. However it is indicated, according to the process described therein, to polymerize in absence of perfluorinated surfactant, operating at a pressure between 5 and 15 bar. This has the disadvantage not to obtain a good productivity.

It is known that the use as comonomers of perfluoropropylvinylether (PPVE) or of 2,2,4-trifluoro-5-trifluoromethoxy-1,3-dioxole (TTD) or perfluoromethoxy-dioxole (MDO) allows to obtain two kinds of the suspension modified PTFE by which differ in some application characteristics. For example, the products modified with perfluoropropylvinylether usually have better tensile characteristics but poorer lower optical characteristics in comparison with the products modified with perfluoromethoxydioxole.

In EP 111,343 a process for producing the suspension modified PTFE is described, by using as comonomer a fluorinated dioxole having the formula:

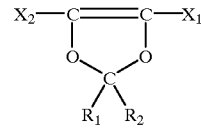

wherein $R_1$, $R_2$ can be F, perfluoroalkyl or hydroperfluoroalkyl, wherein the alkyl groups comprise from 1 to 6 carbon atoms, $X_1$, $X_2$ can be F, Cl or H; the dioxole is preferably the perfluoro 2,2-dimethyl-1,3-dioxole (PDD) wherein $R_1=R_2=CF_3$; $X_1=X_2=F$.

The obtained product has a lower surface roughness in comparison with a product modified with PPVE. In the same patent it is used the addition of the fluorinated surfactant, as initiator the ammonium persulphate (APS) which thermally disocciates, and the process is carried out at 17.5 bar with good yields (240–250 g/(l·hr)). It has been however found from tests carried out by the Applicant (see the examples) that, by operating according to the modalities described in EP 111,343, with monomers more reactive than PPVE, such as for example the perfluorodioxole (PD), the PDD, or the MDO, there is a lowering of the tensile characteristics and the presence of homogeneity defects of the skived tape.

It was therefore felt the need to produce the suspension modified PTFE having the good application properties of this kind of polymers combined with a good homogeneity and a low presence of defects in the skived tapes and with a process having a high productivity.

The Applicant has surprisingly and unexpectedly found that it is possible to obtain high tensile characteristics combined with very good homogeneity of the foiled tape together with a process for preparing modified PTFE allowing an high productivity.

An object of the present invention is a method for preparing the suspension modified PTFE, wherein, as comonomers, perfluoroalkylvinylethers in which alkyl has from 1 to 5 carbon atoms, preferably perfluoropropylvinylether; and/or a perfluorodioxole, preferably perfluoromethoxy-dioxole, are used, characterized by the following conditions:

a part of the comonomer, from 15 to 90% by weight of the total amount, preferably from 30 to 75%, is to be fed at the beginning of the reaction; the remaining part of the comonomer is to be distributed during the reaction so as to obtain a constant speed of the comonomer incorporation in the polymer chain;

a perfluorinated surfactant and a buffering salt are used;

a persulphate with a reducing agent is used as initiator in such a ratio as to generate a part of the radicals from the redox reaction and another one from the persulphate thermal decomposition;

one operates with a polymerization pressure from 15 to 30 bar.

As above said, a constant speed of the comonomer incorporation in the polymer chain can be achieved by calculating by means of some polymerization tests with the selected comonomer the reactivity ratio.

It has been surprisingly found that by using the modality of the comonomer feeding which allows to obtain a constant comonomer incorporation speed in the polymer chain, an improvement of the tensile characteristics and the absence of dishomogeneities (transparent halos, white marbleizations) of the skived tape are obtained, in comparison with the process wherein the comonomer is wholly fed at the beginning of the polymerization (see compartive examples). The presence of transparent halos and white marbleizations in the polymer obtained by feeding the comonomer wholly at the beginning, is already evident when, as comonomer, the perfluoropropylviinylether is used, but it appears in a clearly more marked way when the most reactive comonomers, such as for example perfluoromethoxydioxole or perfluoromethylvinyl-ether, are used.

The use of a small amount of anionic perfluorinated surfactant, preferably sodium perfluorooctanoate, in amount from 20 to 150 ppm; of a buffering salt at alkaline pH, preferably an alkaline metal pyrophosphate, in amount from 0.05 to 20 millimoles/l; of a combined redox/thermal initiator system; together with the modality of the comonomer feeding as described, allow to obtain a product with very good application characteristics, especially in the skived tapes field and improved productivity with respect to the other known polymerization systems.

The polymerization process according to the present invention can be carried out at temperatures ranging from 20° C. to 85° C. by varying the percentage of the redox and thermal contributions in the radical generation. As working pressure, the pressure from 15 to 25 bar can preferably be used.

As initiators the alkaline metals or ammonium persulphates salts can be used. It is preferable to use the potassium persulphate. As reducing agent the Fe (II) salts can be used which are suitable for generating the radicals via redox with a persulphate, preferably iron sulphate (II) or Mohr salt ($(NH_4)_2Fe(SO_4)_2.6H_2O$) can be used. As buffering salts, the salts giving a slightly alkaline pH which reduces the problems connected to the corrosion of the autoclave, can be used, moreover the buffering salt increases the ionic strength of the solution which guarantees the complete precipitation of the polymer from the dispersion. It is preferred to use an alkaline metal pyrophosphate, which combines the action of the buffering agent and of the increase of ionic strength with the complexing process of the Fe(II) and Fe(III) ions present in the solution, by forming a colourless complex.

The comonomer can be used in such amount as to give a polymer containing from 0.01 to 0.5%, preferbly from 0.03 to 0.3% by weight of the incorporated comonomer. As preferred comonomers, perfluoropropylvinylether or 2,2,4-trifluoro-5-trifluoromethoxy-1,2-dioxole, can be mentioned.

The following examples are given for illustrative purposes but they are not limitative of the present invention.

EXAMPLES

Methods for Determining the Product Properties

The PPVE content is determined by IR spectroscopy, by measuring the absorption at 994 cm$^{-1}$ ($A_{994}$) on the 100 mg polymer pellet and calculating according to the formula:

$$PPVE(\% \text{ by weight}) = A_{994} : (W \cdot 5.5)$$

wherein W=pellet weight by grams.

The amorphous index was determined by IR spectroscopy according to the Moynihan method (J.Am.Chem.Soc. 1959, 81, 1045) as a ratio of the $A_{778}$ and $A_{2653}$ absorptions according to the formula:

$$\text{Amorphous index} = A_{778}/A_{2365}$$

The MDO content was determined by mass balance.

For the determination of the absolute specific weight and of the tensile characteristics one moulds under the pressure of 300 kg/cm$^2$ a cylindrical block having 90 mm diameter and 3 kg weight which is sintered at 370° C. with a determined temperature programme. From the cylindrical block, sheets or disks having a 1 mm thickness are cut. The absolute specific weight is determined according to ASTM D1457 method.

For determining the tensile characteristics, specimen according to ASTM D638 mrthod are prepared which are stretched until break with deformation rate equal to 50 mm/min by a tensile dynamometer.

In order to determine optical, dielectric and homogeneity characteristics, a 1 kg tubolar block having 100 mm external diameter and 43 mm internal diameter is moulded under the pressure of 300 Kg/cm$^2$. The tubolar block is sintered at 370° C. and successively is skived on a lathe in a tape (film) having 125 micron thickness. During the skiving the tape homogeneity is evaluated by indicating with a visual method the presence of transparent halos (small points more transparent than the tape) and of the marbleizations (white zones with uncertain limits). On the skived tape the dielectric strength according to ASTM D 149 method and the optical characteristics (transmittance and Haze) on a spherical Hazemeter according to ASTM D1003 method are measured.

Examples 1–5

In a vertical autoclave having a total volume of 1100 liters, 550 l of demineralized and degassed water are introduced with the amounts specified in Tables 1 and 2 of the buffering salt, the fluorinated surfactant (sodium perfluorooctanoate, PFONa) and the initiator (potassium persulphate, KPS). The autoclave top is evacuated from the oxygen by putting it under vacuum and subsequently letting pass a nitrogen flow. In the autoclave the initial amount of comonomer (PPVE or MDO, see Tables 1 and 2) is introduced, the autoclave is put under stirring at 580 rpm, and is pressurized at 17 bar with TFE. During the pressurization the reducing agent is introduced in the desired amounts (see the Tables). The autoclave is brought to the reaction temprature and this is maintained constant for all the duration of the test. The reactor pressure is maintained constant by continuously feeding TFE. After the 3% of the TFE conversion, PPVE is fed in the autoclave with a constant ratio (see the Tables) with respect to TFE up to the end of the reaction.

At the end of the reaction the TFE and comonomer feeding are regulated so as to allow the system to react until the pressure decreases to the desired value, then the autoclave is depressurized. The polymer is discharged in the washer, the mother liquor is removed and the product is washed many times with demineralized water. The polymer succesively is separated from the water by a vibrating screen and is dried in an oven at 210° C. The dried polymer is milled in an air jets mill so as to obtain a powder having average weight diameter, $d_{50}$, of about $20\mu$. The powder is moulded in a block which is sintered, as above described, from which the samples are obtained on which the application characteristics reported in the Tables are determined.

The polymerization conditions, the reactants amounts and the results are reported in Tables 1 and 2. The application results are reported in Tables 1A and 2A.

The abbreviations used in the Tables are:

KPS: potassium persulphate ($K_2S_2O_8$)
SdM: Mohr salt $(NH_4)_2Fe(SO_4)_2.6H_2O$
PFONa: sodium perfluorooctanoate ($C_7F_{15}COONa$)
NaPP: sodium pyrophosphate ($Na_4P_2O_7.10H_2O$)
PPVE in: initial perfluoropropylvinylether
PPVE r: perfluoropropylvinylethetr in reaction medium
MDO in: initial perfluoromethoxydioxole
MDO r: perfluoromethohydioxole in reaction medium
CR t: transversal strength at break
CR l: longitudinal srength at break
AR t: transversal elongation at break
AR l: longitudinal elongation at break
SSG: standard specific gravity
Transmitt.: transmittance Example C1–C3 (Comparative)

EXAMPLE C1

Example 1 is repeated. but by feeding all the comonomer at the beginning.

EXAMPLE C2

Example 3 is repeated but without using the fluorinated surfactant and the buffering salt.

EXAMPLE C3

Example 5 is repeated but by feeding all the comonomer at the beginning.

In the comparative Examples $C_1$–$C_3$ the dielectric strength has the same values as for Ehamples 1–5.

The results of the polymerization tests show that the yields are high and are combined with good optical, tensile and homogeneity properties when one operates according to the process of the invention. The combination of these properties is not obtained if one operates, on the contrary, according to the comparative Examples.

TABLE 1

Polymerization conditions of the modified products with perfluoropropylvinylether (PPVE)

| Example No. | Pressure bar | Treaction °C. | KPS, g | SdM, g | PPONa, g | NaPP, g | PPVE in, g | PPVE r, g/kg $C_2F_4$ | Conversion kg $C_2F_4$ | Duration min. | Reaction speed g/(l · hr) |
|---|---|---|---|---|---|---|---|---|---|---|---|
| 1 | 17 | 70 | 12 | 2.2 | 45 | 480 | 450 | 1.5 | 270 | 130 | 227 |
| 2 | 17 | 70 | 4.7 | 3.6 | 45 | 480 | 220 | 1 | 280 | 140 | 218 |
| 3 | 17 | 75 | 5.8 | 2.2 | 45 | 480 | 250 | 1 | 270 | 120 | 245 |
| $C_1$ | 17 | 70 | 12 | 2.2 | 45 | 480 | 600 | — | 270 | 130 | 227 |
| $C_2$ | 17 | 75 | 5.8 | 2.2 | — | — | 250 | 1 | 270 | 230 | 128 |

TABLE 1A

Application results of the modified products with perfluoropropylvinylether (PPVE)

| Example No. | Transparent halos | Marbleizations | CR t MPa. | CR l, MPa. | Ar t % | Ar l % | SSG. g/cc | PPVE % | Amorphous index | Transmitt. | Haze, % |
|---|---|---|---|---|---|---|---|---|---|---|---|
| 1 | no | no | 29.5 | 30 | 580 | 530 | 2.173 | 0.23 | 0.2 | 92 | 65 |
| 2 | no | no | 42 | 40 | 480 | 480 | 2.172 | 0.1 | 0.1 | 86 | 60 |

TABLE 1A-continued

Application results of the modified products with perfluoropropylvinylether (PPVE)

| Example No. | Transparent halos | Marbleizations | CR t MPa. | CR 1, MPa. | Ar t % | Ar 1 % | SSG. g/cc | PPVE % | Amorphous index | Transmitt. | Haze, % |
|---|---|---|---|---|---|---|---|---|---|---|---|
| 3 | no | no | 39 | 36 | 490 | 480 | 2.177 | 0.12 | 0.15 | 86 | 56 |
| C$_1$ | yes | yes | 27 | 24 | 460 | 440 | 2.175 | 0.22 | 0.2 | 89 | 60 |
| C$_2$ | no | no | 40 | 39 | 500 | 500 | 2.177 | 0.11 | 0.15 | 86 | 65 |

TABLE 2

Polymerization conditions of the modified products with perfluoromethoxydioxole (MDO)

| Example No. | Pressure bar | Treaction °C. | KPS, g | SdM, g | PPONa, g | NaPP, g | MDOin., g | MDOr., g/kg C$_2$F$_4$ | Conversion kg C$_2$F$_4$ | Duration min. | Reaction speed g/(l · hr) |
|---|---|---|---|---|---|---|---|---|---|---|---|
| 4 | 17 | 70 | 5.8 | 2.2 | 45 | 480 | 130 | 1 | 270 | 90 | 327 |
| 5 | 17 | 70 | 12 | 2.2 | 45 | 480 | 280 | 1.4 | 270 | 80 | 368 |
| C$_3$ | 17 | 70 | 12 | 2.2 | 45 | 480 | 515 |  | 270 | 75 | 392 |

TABLE 2A

Application results of the modified products with perfluoromethoxydioxole (MDO)

| Example No. | Transparent halos | Marbleizations | CR t, MPa | CR 1, MPa | Ar t % | Ar 1 % | SSG g/cc | MDO., % | Amorphous index | Transmitt | Haze, % |
|---|---|---|---|---|---|---|---|---|---|---|---|
| 4 | no | no | 37 | 34 | 350 | 350 | 2.162 | 0.1 | 0.14 | 86 | 55 |
| 5 | no | no | 36 | 36 | 325 | 325 | 2.157 | 0.17 | 0.22 | 91 | 43 |
| C$_3$ | yes | yes | 30 | 30 | 290 | 300 | 2.159 | 0.17 | 0.22 | 89 | 49 |

What is claimed is:

1. A suspension method for preparing a modified PTFE comprising:
   polymerizing, in a suspension, a momomer composition comprising:
   perfluoroalkylvinylether comonomers in which the alkyl has from 1 to 5 carbon atoms, and/or perfluorodioxole comonomers; a part of the comonomer composition, from 15% to 90% by weight of the total amount, is available at the beginning of the reaction and the remaining part of the comonomer composition is distributed during the polymerization reaction to obtain a constant rate of comonomer incorporation in a forming polymer chain; said suspension further comprising:
   a perfluorinated surfactant and a buffering salt,
   a persulfate with a reducing agent as an initiator in a ratio to generate radicals from a redox reaction and wherein additional radicals are generated by a thermal decomposition of the persulfate; and
   conducting the polymerization reaction at a pressure from 15 to 30 bar.

2. The method according to claim 1, wherein 30% to 75% of the comonomer composition is available at the the beginning of the polymerization reaction.

3. The method according to claim 1, wherein the comonomers are perfluoropropylvinylether and/or perfluoromethoxydioxole.

4. The method according to claim 1, wherein the perfluorinated surfactant is anionic and it is present in the range of from 20 to 150 ppm, and the amount of the buffering salt, at an alkaline pH, ranges from 0.05 to 20 millimoles per liter.

5. The method according to claim 4, wherein the perfluorinated anionic surfactant is sodium perfluorooctanoate and the buffering salt is a pyrophosphate of an alkaline metal.

6. The method according to claim 1, wherein the polymerization reaction is carried out at pressures of 15 to 25 bar, and at from 20 to 85° C. by varying the percentage of the redox thermal contributions of radical generation.

7. The method according to claim 1, wherein the initiators are selected from the group consisting of alkaline metals and ammonium persulphate salts, and the reducing agent is an Fe (II) salt.

8. The method according to claim 7, wherein potassium persulfate is the initiator and iron sulphate (II) or Mohr salt is the reducing agent.

9. The method according to claim 1, wherein the comonomer is present in amounts to yield a polymer containing from 0.01 to 0.5% by weight of the incorporated monomer.

10. The method according to claim 9, wherein the comonomer is present in amounts to yield a polymer containing 0.03 to 0.3% by weight of the incorporated monomer.

* * * * *